United States Patent [19]
Shimbo

[11] Patent Number: 6,088,798
[45] Date of Patent: Jul. 11, 2000

[54] DIGITAL SIGNATURE METHOD USING AN ELLIPTIC CURVE, A DIGITAL SIGNATURE SYSTEM, AND A PROGRAM STORAGE MEDIUM HAVING THE DIGITAL SIGNATURE METHOD STORED THEREIN

[75] Inventor: Atsushi Shimbo, Urayasu, Japan

[73] Assignee: Kabushiki Kaisha Toshiba, Kawasaki, Japan

[21] Appl. No.: 08/938,958

[22] Filed: Sep. 26, 1997

[30] Foreign Application Priority Data

Sep. 27, 1996 [JP] Japan ................................. 8-256945

[51] Int. Cl.[7] ........................................... H04L 9/32
[52] U.S. Cl. .......................... 713/176; 713/170; 713/180; 380/30
[58] Field of Search ..................... 713/100, 170, 713/176, 180; 380/23, 28, 30

[56] References Cited

U.S. PATENT DOCUMENTS 5,146,500  9/1992  Maurer ...................................... 380/30

FOREIGN PATENT DOCUMENTS 6-95590  4/1994  Japan .

OTHER PUBLICATIONS

Boyd, C., "Digital Multisignatures," in Cryptography and Coding, Beker, H.J. and Piper, F.C., Ed. Inst. of Math & Appl., Dec. 12, 1986, pp. 241–246.

Menezes, A., "Elliptic Curve Public Key Cryptosystems," Kluwer Academic, 1993, pp. 91–92.

N. Koblitz, "A Course in Number Theory and Cryptography", GTM114, (1986) Springer–Verlag, pp. 160–171.

K. Ohta, et al., "A Digital Multisignature Scheme Based on the Flat–Shamir Scheme", Advances in Cryptology, Proceedings of ASIACRYPT '91, Springer–Verlag, pp. 139–148, (1993).

*Primary Examiner*—Tod R. Swann
*Assistant Examiner*—Justin T. Darrow
*Attorney, Agent, or Firm*—Oblon, Spivak, McClelland, Maier & Neustadt, P.C.

[57] ABSTRACT

A digital signature method comprises the signature data generating step of, by the use of system information including an elliptic curve E/Fq over a finite field and a base point G on the elliptic curve E/Fq, a signer's public key Y defined by a point on the elliptic curve E/Fq, and the signer's secret key x generated so as to fulfill the public key $Y=x \cdot G$, generating signature data including not only at least part of data on a point R on the elliptic curve E/Fq dependent on an arbitrarily generated random number k and the base point G on the elliptic curve E/Fq but also an integer s dependent on the plaintext data M, secret key x, and random number k, and the signature checking step of, by the use of an integer m dependent only on the plaintext data M, an integer r dependent on at least the point R of the point R on the elliptic curve E/Fq and the plaintext data M, at least part of data on the point R and the integer s that constitute the signature data, and the system information, and the signer's public key Y, checking a signature by using a relational equation defined as $\pm s \cdot G = \pm m \cdot Y \pm r \cdot R$ over E/Fq (where the + and − signs are determined by a specific condition) or a relational equation equivalent to the above relational equation as a signature checking equation.

14 Claims, 9 Drawing Sheets

DIGITAL SIGNATURE METHOD USING AN ELLIPTIC CURVE, A DIGITAL SIGNATURE SYSTEM, AND A PROGRAM STORAGE MEDIUM HAVING THE DIGITAL SIGNATURE METHOD STORED THEREIN

BACKGROUND OF THE INVENTION

This invention relates to a digital signature method of realizing a signature and seal function for digital plaintexts, a digital signature system constructed using the digital signature method, and a program storage device in which a program concerning the digital signature method has been stored.

Various methods of generating digital signatures have been proposed. Typical ones of them are a method based on the difficulty of the problem of factorization into prime factors and a method based on the difficulty of a discrete logarithm problem. The method based on a discrete logarithm problem includes a method using a multiplicative group over an ordinary finite field and a method using an additive group on an elliptic curve. It is said that a discrete logarithm problem in an additive group on an elliptic curve is safer than a discrete logarithm problem in a multiplicative group over an ordinary finite field or the problem of factorization into prime factors, since a method of solving the former efficiently has not been found.

It is known that when a digital signature or a public key cryptosystem is composed with the same security, a system based on a discrete logarithm problem on an elliptic curve enables the size of a parameter to be set smaller than a system based on another problem, which leads to the effect of reducing the amount of processing.

When the characteristic of a finite field Fq is neither 2 or 3, an elliptic curve E/Fq over the finite field Fq is defined by parameter a and parameter b and finite field Fq in the following equation (1):

$y^2 = x^3 + ax + b$ ($a, b, x,$ and $y$ are elements of the finite field $Fq$) +tm (1)

where y^2 represents the square of y and x^3 denotes the cube of x. Hereinafter, x^a indicates raising x to the a-th power.

The elements of the elliptic curve E/Fq consist of pairs of (x, y) meeting equation (1) (these pairs are referred to as points on the elliptic curve) and a point at infinity O. The point at infinity O cannot be expressed in the form of a pair (x, y) of elements of the finite field Fq. In practical use, however, a one-bit flag representing the point at infinity has only to be provided. It is known that a set of points on the elliptic curve forms a group for addition. Regarding the addition, the point at infinity makes an identity element.

A more detailed explanation of an elliptic curve E/Fq and the definition of addition have been given in, for example, Koblitz, "A Course in Number Theory and Cryptography," Springer-Verlag. Hereinafter, unless otherwise specified, capital letters represent points (i.e., pairs of elements over a finite field Fq or a point at infinity) and small letters denote elements of a finite field Fq or natural numbers. The finite field Fq is made up of as many elements as $q = p^t$ gives (where p is a prime number and t is a positive integer). For example, typical examples of the finite field Fq are a prime field Zp (composed of integers ranging from 0 to p−1) and a 2's extension field GF of (2^t).

One typical digital signature scheme on an elliptic curve is an ElGamal signature on an elliptic curve. The method uses finite fields Fq, a, and b defining an elliptic curve, a base point G, and the order z of the base point G as a public key. The order z of the base point G is the smallest positive integer that meets the following: $z \cdot G = O$ (infinity) over E/Fq.

The secret key for the signature generator is an integer x relatively prime to and less than the order z and the public key for the signature generator is the following point Y:

$Y = x \cdot G$ over $E/Fq$

A digital signature for an integer m (which is generally digest information obtained by calculating plaintext data M expressed in digital bit strings using a cryptographic hash function) depending only on plaintext data M is generated by the following procedure. First, a random number k, a natural number relatively prime to and less than the order z, is determined and from the k, R in the following equation is found:

$R = k \cdot G$ over $E/Fq$

Next, using a function f that converts the point data on the elliptic curve into natural numbers in Zz (the natural numbers equal to or less than z−1), r is found:

$r = f(R)$

For example, a hash function may be used.
Further, the following s is found:

$s = (m - x \cdot r)/k \pmod{z}$

The signature data is a pair of (R, s). The verification of the signature is carried out by checking to see if m, R, and s fulfill the following equation:

$r = f(R)$ $m \cdot G = r \cdot Y + s \cdot R$ over $E/Fq$

The ElGamal signature scheme has been written in detail in "T. ElGamal," "A public key cryptosystem and a signature scheme based on discrete logarithms," IEEE Trans. IT, Vol. IT-31, No. 4, July 1985, pp. 469–472.

The aforementioned signature scheme can realize the function of sealing an ordinary electronic document. In addition to this, the function of allowing more than one signer to seal an electronic circular document is also wanted. Such a function can be constructed by concatenating the signature data items by more than one signer concerning the same document. The construction, however, has a disadvantage in that as the number of signers increases, the amount of signature data and the amount of processing needed in checking a signature increase accordingly. A scheme by which the increase of the signature data size is minimized or a scheme by which the amount of processing required in checking a signature is suppressed, as compared with a scheme by which signatures are simply concatenated, has been proposed. They are called multisignature schemes.

The multisignature schemes, however, have not used the ElGamal signature scheme based on the difficulty of a discrete logarithm problem on an elliptic curve.

BRIEF SUMMARY OF THE INVENTION

Accordingly, the object of the present invention is to provide a digital signature method using an elliptic curve that enables a multisignature system capable of dealing with various operation forms to be constructed easily, a digital signature system constructed using the digital signature method, and a program storage device in which a program concerning the digital signature method has been stored.

The foregoing object is accomplished by providing a digital signature method of generating digital signature data for plaintext data M and checking a signature on the basis of the digital signature data, the digital signature method comprising: the signature data generating step of, by the use of system information including an elliptic curve E/Fq over a finite field Fq and a base point G on the elliptic curve E/Fq, a signer's public key Y defined by a point on the elliptic curve E/Fq, and the signer's secret key x generated so as to fulfill the public key Y=x·G, generating signature data including not only at least part of data on a point R on the elliptic curve E/Fq dependent on an arbitrarily generated random number k and the base point G on the elliptic curve E/Fq but also an integer s dependent on the plaintext data M, secret key x, and random number k; and the signature checking step of, by the use of an integer m dependent only on the plaintext data M, an integer r dependent on at least the point R of the point R on the elliptic curve E/Fq and the plaintext data M, at least part of data on the point R and the integer s that constitute the signature data, and the system information, and the signer's public key Y, checking a signature by using a relational equation defined as ±s·G= ±m·Y±r·R over E/Fq (where the + and − signs are determined by a specific condition) or a relational equation equivalent to the above relational equation as a signature checking equation.

The foregoing object is also accomplished by providing a digital signature system comprising a signature data generating device for generating digital signature data for plaintext data M and a signature checking device for checking a signature on the basis of the digital signature data, wherein the signature data generating device includes means for, by the use of system information including an elliptic curve E/Fq over a finite field Fq and a base point G on the elliptic curve E/Fq, a signer's public key Y defined by a point on the elliptic curve E/Fq, and the signer's secret key x generated so as to fulfill the public key Y=X·G, generating signature data including not only at least part of data on a point R on the elliptic curve E/Fq dependent on an arbitrarily generated random number k and the base point G on the elliptic curve E/Fq but also an integer s dependent on the plaintext data M, secret key x, and random number k; and the signature checking device includes means for, by the use of an integer m dependent only on the plaintext data M, an integer r dependent on at least the point R of the point R on the elliptic curve E/Fq and the plaintext data M, at least part of data on the point R and the integer s that constitute the signature data, and the system information, and the signer's public key Y, checking a signature by using a relational equation defined by a specific arithmetic operation between a first term s·G consisting of the product of the integer s and the base point G on the elliptic curve E/Fq, a second term m·Y consisting of the product of the integer m and the public key Y, and a third term r·R consisting of the product of the integer r and the point R on the elliptic curve E/Fq or a relational equation equivalent to the above relational equation as a signature checking equation.

The foregoing object is still accomplished by providing a program storage device that can be read by a machine for executing the steps in a method of generating digital signature data for plaintext data M and checking a signature on the basis of the digital signature data, wherein the steps includes the signature data generating step of, by the use of system information including an elliptic curve E/Eq over a finite field Fq and a base point G on the elliptic curve E/Fq, a signer's public key Y defined by a point on the elliptic curve E/F, and the signer's secret key x generated so as to fulfill the public key Y=x·G, generating signature data including not only at least part of data on a point R on the elliptic curve E/Fq dependent on an arbitrarily generated random number k and the base point G on the elliptic curve E/Fq but also an integer s dependent on the plaintext data M, secret key x, and random number k; and the signature checking step of, by the use of an integer m dependent only on the plaintext data M, an integer r dependent on at least the point R of the point R on the elliptic curve E/Fq and the plaintext data M, at least part of data on the point R and the integer s that constitute the signature data, and the system information, and the signer's public key Y, checking a signature by using a relational equation defined by a specific arithmetic operation between a first term s·G consisting of the product of the integer s and the base point G on the elliptic curve E/Fq, a second term m·Y consisting of the product of the integer m and the public key Y, and a third term r·R consisting of the product of the integer r and the point R on the elliptic curve E/Fq or a relational equation equivalent to the above relational equation as a signature checking equation.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First, embodiments of the present invention will be outlined.

A digital signature scheme in a first outline is a modification of the ElGamal signature scheme on an elliptic curve. It differs from the conventional ElGamal signature scheme on an elliptic curve in that the plaintext data M, signature data s, and integer r depending on at least signature data R of the signature data R and plaintext data M generated from random numbers in the signature checking equation are replaced with each other on the basis of a specific rule. Since s on which the secret key for each signer has acted is produced in the form: $s = m \cdot x + r \cdot k \pmod{z}$, even if more than one secret key x is used, the plural secret keys x are combined together through addition, because the plaintext data M is common in the case of multisignature. This leads to an advantage of easier expansion to the multisignature scheme using the same scheme.

Because $r \cdot k$ is a term unaffected even when more than one secret key x is used, an integer r may be allowed to depend on both of point R and plaintext data M, in addition to depending on only point R generated from a random number. By doing so, improved security will be obtained.

As described above, a modification of the ElGamal signature scheme on an elliptic curve also enables the signers having the secret keys x corresponding to a public key Y to generate signature data items R, s meeting the checking equation. Regarding a way of finding signature data items R, s when the signers have no secret key x, no method except for a method of solving a discrete logarithm problem on an elliptic curve has been proposed. Therefore, the digital signature scheme in the first outline is effective as a digital signature scheme.

Next, a second outline of the digital signature scheme will be given. In the second outline, the digital signature scheme in the first outline is applied to a multisignature scheme. Each of signers generates a random number k. A point R on an elliptic curve dependent on each random number k is generated by first causing the data to take a round. Thereafter, each of the signers generates a partial signature s from the random number k the user has generated himself and his secret key x and causes the partial signature to take a round.

In the round of the partial signature s, the signer merges his partial signature into the partial signature generated beforehand by the previous signers. In this way, the last signer' process produces the multisignature data items R and s.

The checking equation in signature checking is obtained by replacing the public key Y in the checking equation in the first outline with the sum of the public keys $Y_i$ of the individual signers. If any one of the secret keys $x_i$ does not participate in the cycle, neither R nor s meeting the checking equation will be obtained. Therefore, the digital signature scheme in the second outline is effective as a digital signature scheme for more than one signer.

Next, a third outline of the digital signature scheme will be given. In the third outline, the digital signature scheme in the first outline is applied to a successive (a single-round) multisignature scheme. Each of signers generates a random number k and generates a point R on an elliptic curve dependent on this random number k. Each signer generates a new partial signature s by transforming the partial signature s obtained from the preceding signer to his secret key x and the random number k used to generate point R, and send the new partial signature s to the next signer. At the same time, a point which is independently generated from the partial signature s is added as a part of the signature data. In this way, the last signer's process produces the multisignature data items s, $R_1, R_2, \ldots, R_n$.

The checking equation in signature checking is obtained by replacing the public key Y in the checking equation in the first outline with the sum of the public keys $Y_i$ of the individual signers and further replacing the term of point R with the sum of $r_i \cdot R_i$ of each signer.

Hereinafter, referring to the accompanying drawing, the above-described outlines will be explained in detail.

Figure 1:
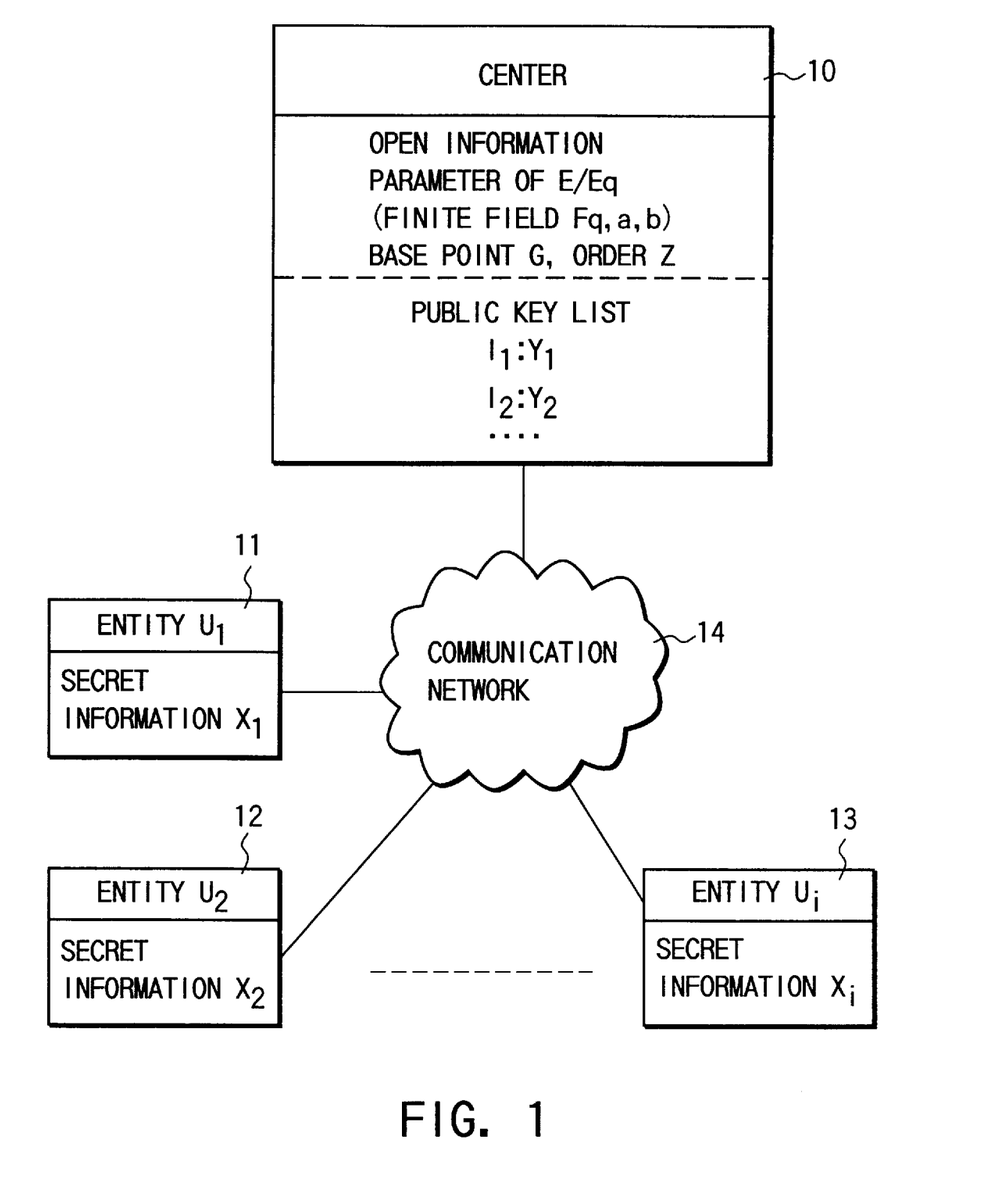
FIG. 1 shows the basis configuration of a digital signature system according to a first embodiment of the present invention.

FIG. 1 shows the basic configuration of a digital signature system according to a first embodiment of the present invention. As shown in FIG. 1, the system comprises a center 10 and a communication network 14 composed of a plurality of entities 11, 12, 13 ($U_1, U_2, \ldots, U_i$) corresponding to users. The center 10 generates a parameter for an elliptic curve E/Fq and makes it open to the public. The center also finds the base point G on the elliptic curve E/Fq and its order and makes them open to the public.

The center further makes open a function f and a function h. They are cryptographic hash functions. Receiving an input of a given size, they output an integer with a fixed length of about 160 bits as digest information. Concrete examples are SHA, MD5, and RIPE-MD. The functions f and h may be the same function.

Each entity $U_i$ determines a random number $x_i$ that is a natural number equal to or less than z−1, and makes the $x_i$ an entity secret key. Furthermore, an entity public key $Y_i$ is determined using the following equation:

$$Y_i = x_i \cdot G \text{ over } E/Fq$$

The entity $U_i$ sends the entity public key $Y_i$ to the center 10 and the center 10 registers $Y_i$ in the entity $U_i$'s area in the public key list. Only the center 10 can rewrite the public key list. Any entity can read the public key list. The entity $U_i$'s ID information (identification information) is determined to be $I_i$.

Figure 2A:
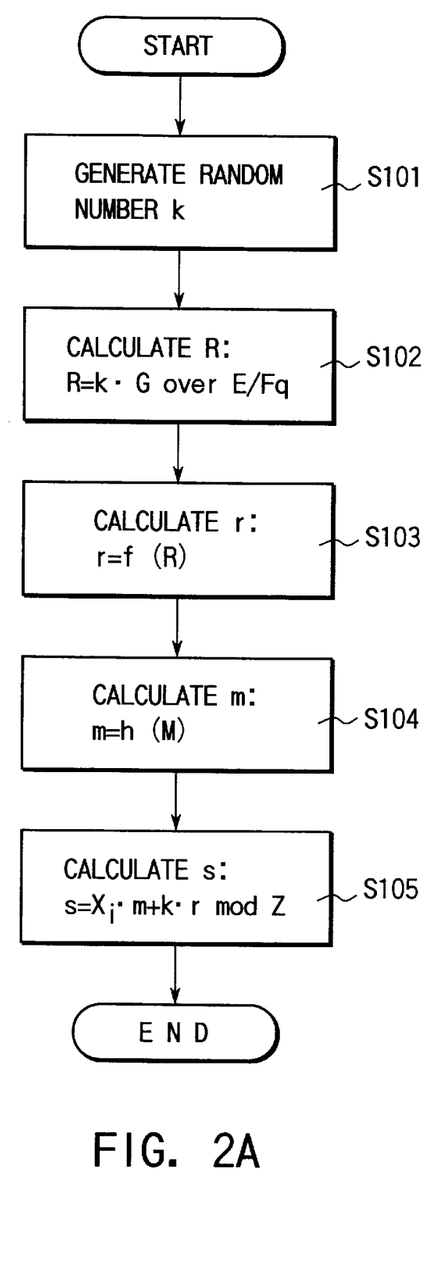
FIG. 2A shows the signature generating procedure in the first embodiment and FIG. 2B shows the checking procedure.

FIG. 2A shows the procedure by which the entity $U_i$ generates a digital signature for plaintext data M.

Procedure at Entity $U_i$

| | |
|---|---|
| 1: Generate a random number k (1 < k < z − 1) | (step 101) |
| 2: Calculate R = k·G over E/Fq | (step 102) |
| 3: Calculate r = f(R) | (step 103) |
| 4: Calculate m = h(M) | (step 104) |
| 5: Calculate s = $x_i$·m + k·r mod z from m, r, and secret key $x_i$ | (step 105) |

The R and s thus generated make a digital signature for the entity $U_i$'s plaintext M.

Because step 101 to step 103 in the signature generating procedure are independent of the plaintext M, it is possible to calculate k, R, and r before a request to generate a digital signature is made and store several sets of (k, R, r). This means that steps 104 and 105 are needed only when the generation of a signature is requested, decreasing the processing time.

Figure 2B:
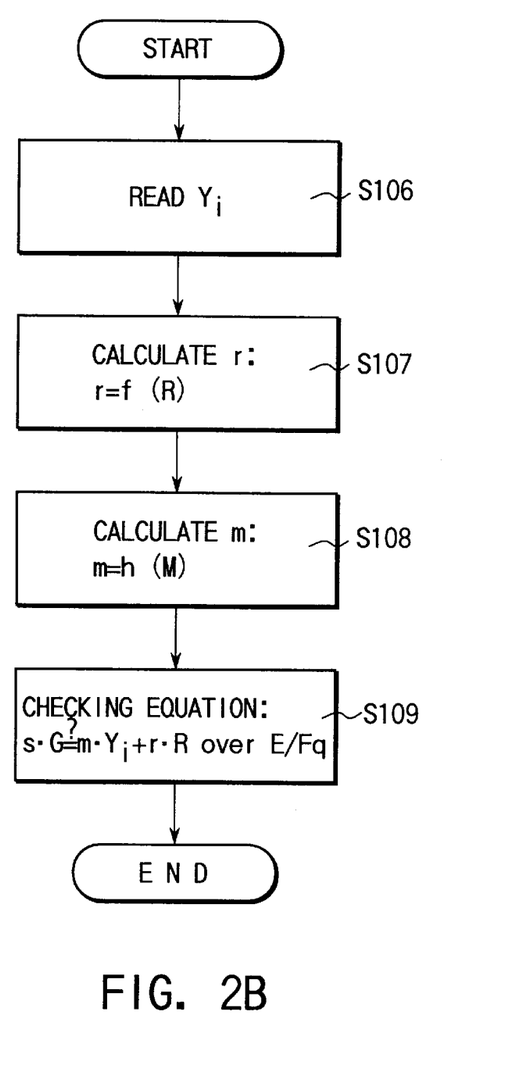

Next, the procedure for checking the digital signature will be explained by reference to FIG. 2B.

Signature Checking Procedure

| 1: Take out the entity $U_i$'s public key $Y_i$ from the public list | (step 106) |
| 2: Calculate r = f(R) | (step 107) |
| 3: Calculate m = h(M) | (step 108) |
| 4: Confirm that r, s, m, $Y_i$ fulfill the following equation:<br>$s \cdot G = m \cdot Y_i + r \cdot R$ over E/Fq | (step 109) |

When they meet the equation, (R, s) is determined to be the digital signature for the entity $U_i$'s plaintext M.

It is evident that the (R, s) generated by the procedure at step 101 to step 105 fulfills the checking equation at step 109. It is considered that an entity with no discrete logarithm $x_i$ of $Y_i$ has almost the same difficulty in finding a set of (R, s) meeting the checking equation at step 109 with the plaintext data M being given as in solving a discrete logarithm problem on an elliptic curve. For example, if the entity first determines R, it will have to find s meeting s·G=const over E/Eq, which is none other than a discrete logarithm problem. In contrast, if the entity first determines s, it will have to find R meeting r·R=const over E/Eq. A method of solving this equation has not been known to the public.

Various modifications of the signature checking equation used in the digital signature method of the embodiment can be considered. Typical ones will be shown below. It should be noted that they execute basically the same checking operation.

First, from the transposition of the terms on the left side or right side of the checking equation, it is evident that the checking equation at step 109 is equivalent to checking the following:

$$s \cdot G - m \cdot Y_i - r \cdot R = O \text{ over } E/Fq$$

$$-s \cdot G + m \cdot Y_i + r \cdot R = O \text{ over } E/Fq$$

Furthermore, from the transposition of the terms on the left side or right side of the checking equation and the multiplication of the both sides by the reciprocals of s, m, and r in Fq, it is evident that the checking equation at step 109 is equivalent to checking the following:

$$(s/r) \cdot G - (m/r) \cdot Y_i = R \text{ over } E/Fq \quad (2)$$

$$(s/m) \cdot G - (r/m) \cdot R = Y_i \text{ over } E/Fq$$

$$(m/s) \cdot Y_i + (r/s) \cdot R = G \text{ over } E/Fq$$

Moreover, since changing the signs of the three items s·G, m·$Y_i$, r·R in the checking equation (that is, changing + to − or vice versa. Concretely, ±s·G=±m·$Y_i$±r·R=O over E/Fq will do. The + and − signs are determined in the process of generating a signature as explained below) also corresponds to changing the signs of s, $x_i$·m, and k·r in step 105 in the process of generating a signature, it should be noted that the signature method with the changed signs of three items in the checking equation is basically equivalent to the method of the embodiment.

In the signature method of the present invention, f(R, M) may be used in place of f(R). The f(R, M) represents a hash value that has been determined by the signer at random and is dependent on both of data on point R on an elliptic curve and the plaintext data M. Specifically, a hashing method of concatenating R and M or a keyed hash method with data R as a key may be used.

In a modified procedure, r=f(R) is replaced with r=f(R, M) at step 103 and step 107. In general, the procedure thus modified has an improved safety because it assures that r has been generated from R and M.

The present embodiment is characterized by judging whether or not the sum of the following three items corresponds to the point at infinity: item r·R dependent on a random number generated each time the signer generates a signature and the base point G, the term m·$Y_i$ dependent only on the signer's public key $Y_i$ and plaintext M to be signed, and the term s·G where the number of additions of base point G is changed according to s on which the signer's secret key $x_i$ has acted.

When equation (2) is used as the checking equation, the signature data size can be reduced. Hereinafter, the procedure for reducing the signature data size will be described concretely.

The procedure by which entity $U_i$ generates a digital signature for plaintext M is basically the same as the aforementioned procedure. A check is made to see if r at step 107 is relatively prime to order r. If they are not relatively prime to each other, control will return to step 101, where another random number k will be generated. The data items on the finally outputted digital signature are r and s and r is used in place of point R. This reduces the signature data size to about ⅔ of the original one.

A digital signature checking procedure obtained, which is a modification of the above-described checking procedure, will be explained by reference to FIG. 3.

Signature Checking Procedure

| 1: Take out the public key $Y_i$ for entity $U_i$ from the public list | (step 1101) |
| 2: Calculate m = h(M) | (step 1102) |
| 3: Calculate 1/r (mod Z) | (step 1103) |
| 4: Calculate point R in the following equation<br>$R = (s/r) \cdot G - (m/r) \cdot Y_i$ over E/Fq | (step 1104) |
| 5: Confirm that point R and r in signature data fulfill the following equation<br>r = f(R) | (step 1105) |

When they fulfill the equation, it will be judged that (r, s) is the digital signature for plaintext M at entity $U_i$.

Figure 4A:
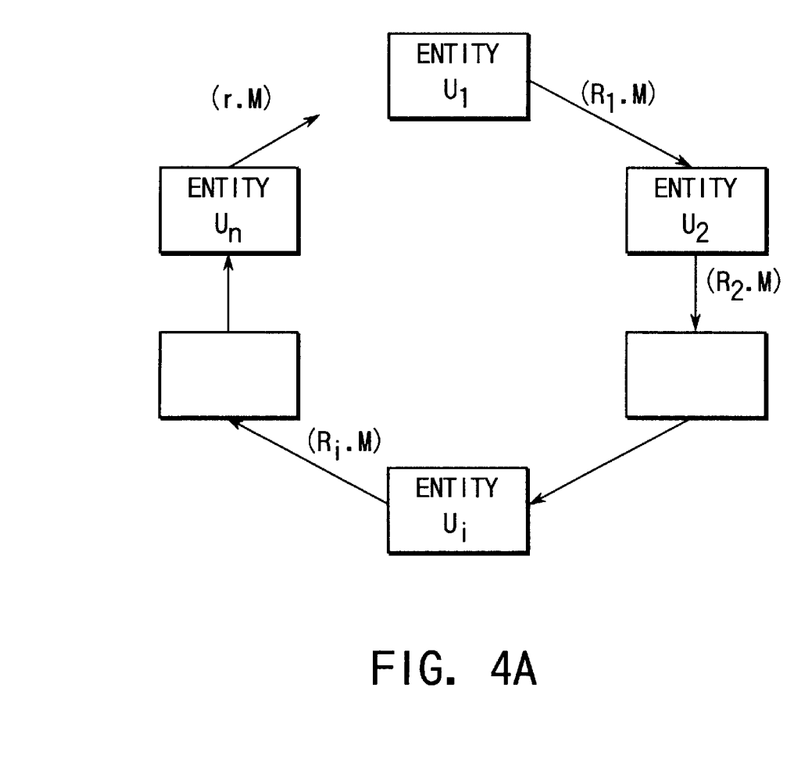
FIGS. 4A and 4B each show the flow of information in a double-round multisignature method according to a second embodiment of the present invention.
Figure 4B:
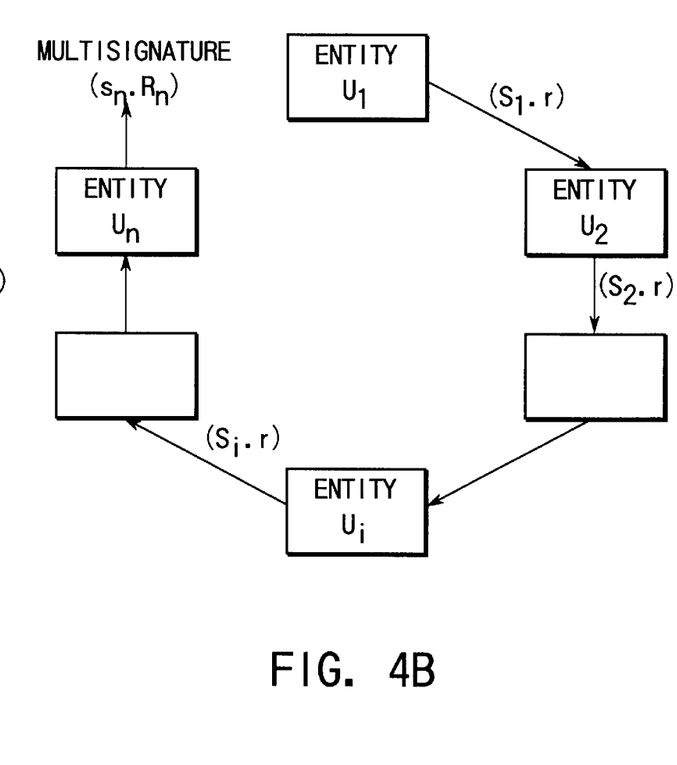
Figure 5A:
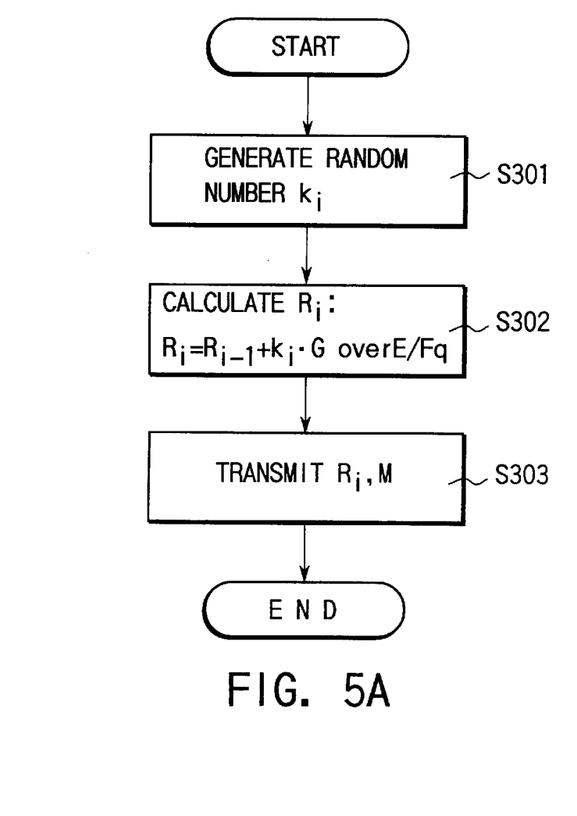
FIGS. 5A and 5B show the signature generating procedure in the double-round multisignature method.
Figure 5B:
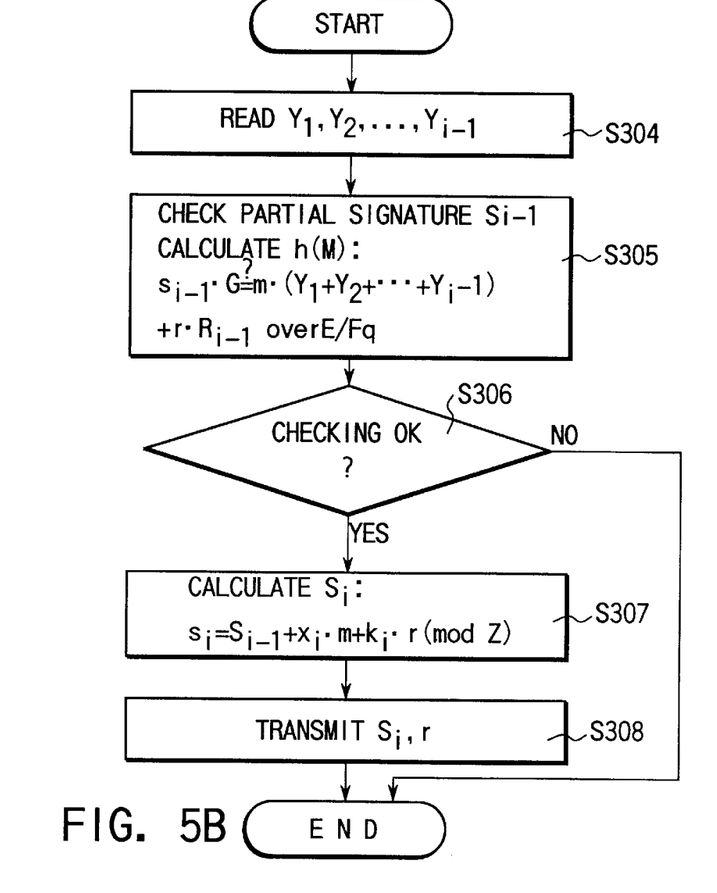

Hereinafter, a digital signature method according to a second embodiment where the digital signature shown in FIG. 1 has been applied to multisinature will be explained. FIGS. 4A and 4B each show the flow of information in multisignature. FIGS. 5A and 5B each show the processing procedure at each entity.

It is assumed that an n number of entities $U_1, U_2, \ldots, U_n$ put a multisignature on plaintext M. The generation of a multisignature involves two round operations: the round of generating $R_n$ in FIG. 4A and the round of generating $s_n$ in FIG. 4B. FIG. 5A shows the processing procedure at entity $U_i$ in the round of generating $R_n$ and FIG. 5B shows the processing procedure at entity $U_i$ in the round of generating $s_n$.

9

(1) Round of Generating $R_n$

<Procedure at Entity $U_i$> (i=1, 2, ..., n)

1: Generate random number $k_i$ (1<$k_i$<z−1) (step 301)

2: Generate $R_i$ in the following equation from the information $R_{(i-1)}$ and random number $k_i$ received from entity $U_{(i-1)}$:

$$R_i = R_{(i-1)} + k_i \cdot G \text{ over } E/Eq \quad \text{(step 302)}$$

3: Transmit information $R_i$ and plaintext M to entity $U_{(i+1)}$ (step 303)

The above processes are executed at the entities, starting with entity $U_1$ to entity $U_n$ in sequence, thereby generating $R_n$. Entity $U_1$ carries out the process at step 302 for $R_0$=O (the point at infinity).

Furthermore, entity $U_n$ finds r from the generated information $R_n$ using r=f($R_n$) and transmits the r to entity $U_1$ and proceeds to the round of generating $s_n$.

(2) Round of Generating $s_n$

<Procedure at Entity $U_i$> (i=1, 2, ..., n)

1: Take out the public keys $Y_1, Y_2, \ldots, Y_{(i-1)}$ of the entities $U_1, U_2, \ldots, U_{(i-1)}$ from the public key list (step 304)

2: Confirm that the $R_{(i-1)}$ from entity $U_{(i-1)}$ in the round of generating $R_n$ and the r, $s_{(i-1)}$ received from entity $U_{(i-1)}$ in the same round fulfill the following relationship: (step 305)

Calculate m=h(M)

$$s_{i-1} \cdot G = m \cdot (Y_1 + Y_2 + \ldots + Y_{i-1}) + r R_{i-1} \text{ over } E/Fq$$

3: If they do not fulfill the relationship at step 305, it is conceivable that abnormalities have occurred in the processing at entity $U_{i-1}$, and the processing will be terminated (step 306)

4: Calculate $s_i$ in the following equation using the random number $k_i$ generated in the preceding round and the entity's secret key $x_i$ (step 307):

$$s_i = s_{i-1} + x_i \cdot m + k_i \cdot r \mod z$$

5: Send $s_i$, r to entity $U_{i+1}$ (step 308)

The above processes are executed at the entities, starting with entity $U_1$ to entity $U_n$ in sequence, thereby generating $s_n$. Entity $U_1$ carries out the process at step 307 for $s_0$=0.

In the above procedure, steps 304, 305, and 306 are the process of checking the partial signature $s_{i-1}$. They may be eliminated. When the process of checking the partial signature is eliminated, checking is done only after a multisignature ($R_n$, $s_n$) is generated. To detect an improper act done by a signer as soon as possible, the process of checking the partial signature at steps 304, 305, and 306 is effective.

Figure 6:
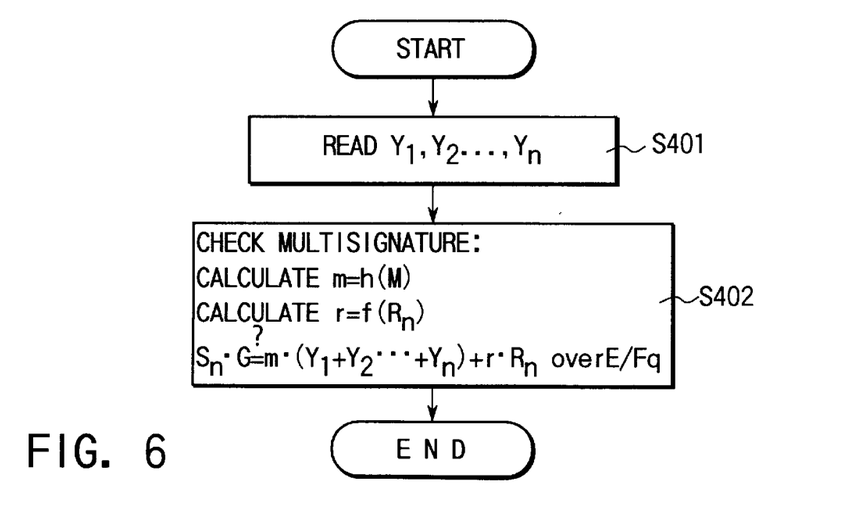
FIG. 6 shows the checking procedure in the double-round multisignature method.

FIG. 6 shows the procedure for checking the multisignature generated by the procedure in FIGS. 5A and 5B. The following processes are carried out in checking. Checking a signature needs $R_n$, $s_n$, and M and the entity's ID data items $I_1, I_2, \ldots, I_n$.

1: Take out the public keys $Y_1, Y_2, \ldots, Y_n$ of the entities $U_1, U_2, \ldots, U_n$ from the public key list (step 401)

2: Confirm that $R_n$, $s_n$, and M fulfill the following relationship: (step 402)

Calculate m=h(M)

Calculate r=f($R_n$)

$$s_n \cdot G = m \cdot (Y_1 + Y_2 + \ldots + Y_n) + r R_n \text{ over } E/Fq$$

10

When the relationship holds, ($R_n$, $s_n$) is judged to be the proper multisignature.

In the multisignature generating procedure and multisignature checking procedure, r=f($R_n$) may be replaced with r=f($R_n$, M). Furthermore, in the multisignature checking procedure, r=f($R_n$) at step 402 is replaced with r=f($R_n$, M).

Next, the procedure for applying the signature checking procedure of FIG. 3 to the multisignature will be explained.

The procedure by which entity $U_i$ generates a digital signature for plaintext M is basically the same as that in FIGS. 5A and 5B. For $R_n$ generated as a result of the calculation at step 302 at entity $U_n$, r=f($R_n$) is calculated and it is confirmed that r is relatively prime to the order z. If they are relatively prime to each other, control will return to step 301, where another random number $k_n$ will be generated. The r outputted from entity $U_n$ in the round of generating $R_n$ is relatively prime to z. The finally outputted multisignature data items after the completion of the second round are r and $s_n$.

Next, the procedure for checking the digital signature will be explained.

Figure 7:
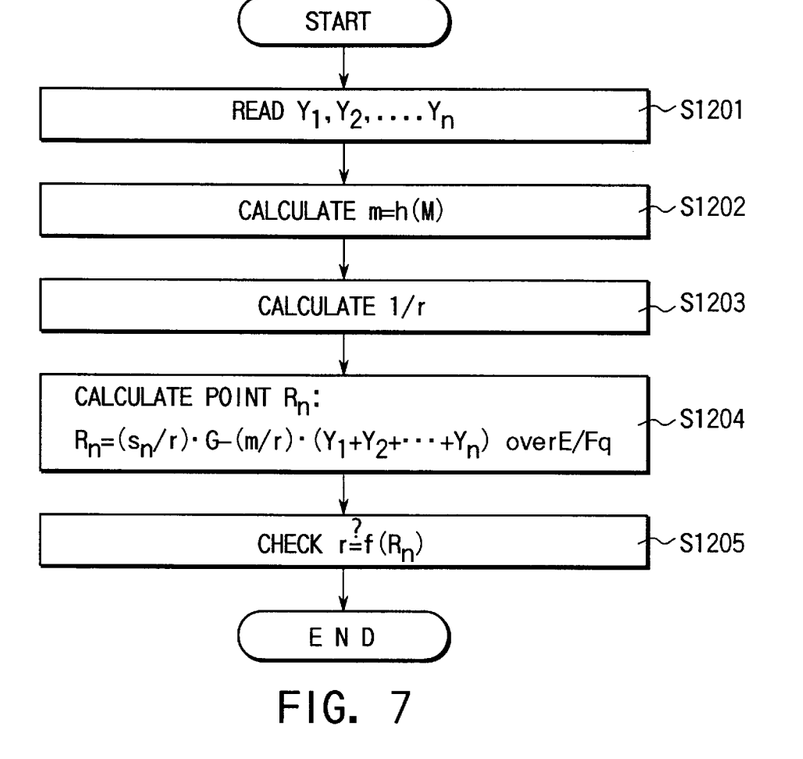
FIG. 7 shows a modification of the signature checking procedure in the double-round multisignature method.

FIG. 7 shows the procedure for checking the multisignature generated by the procedure.

1: Take out the public keys $Y_1, Y_2, \ldots, Y_n$ of the (step 1201)
entities $U_1, U_2, \ldots, U_n$ from the public key list
2: Calculate m = h(M) (step 1202)
3: Calculate 1/r (mod Z) (step 1203)
4: Calculate point $R_n$ in the following equation (step 1204)
$R_n = (s_n/r) \cdot G - (m/r) \cdot (Y_1 + Y_2 + \ldots + Y_n)$ over E/Fq
5: Confirm that point $R_n$ and r in the signature (step 1205)
data fulfill the following relationship:
$r = f(R_n)$ When the relationship holds, (r, $s_n$) is judged to be the proper multisignature.

Figure 8:
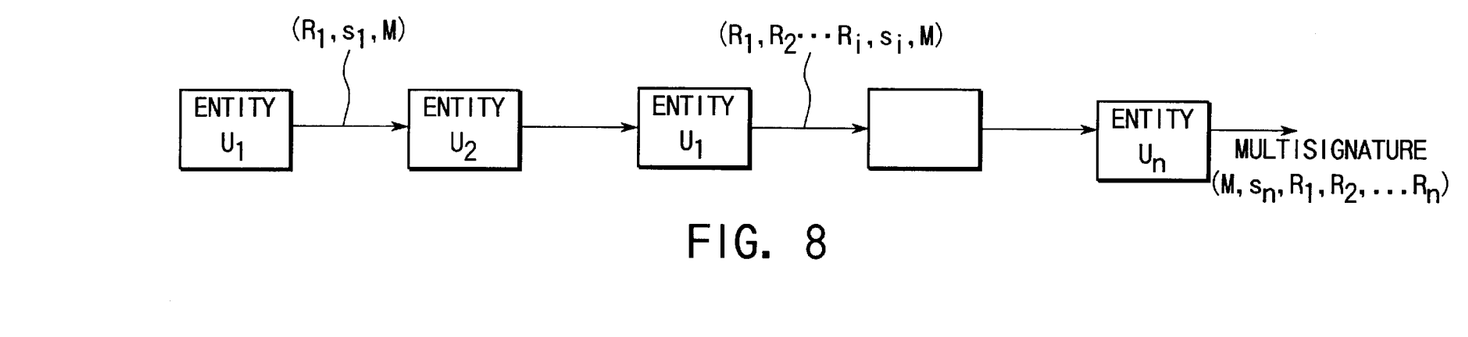
FIG. 8 shows the flow of information in a single-round multisignature method according to a third embodiment of the present invention.
Figure 9:
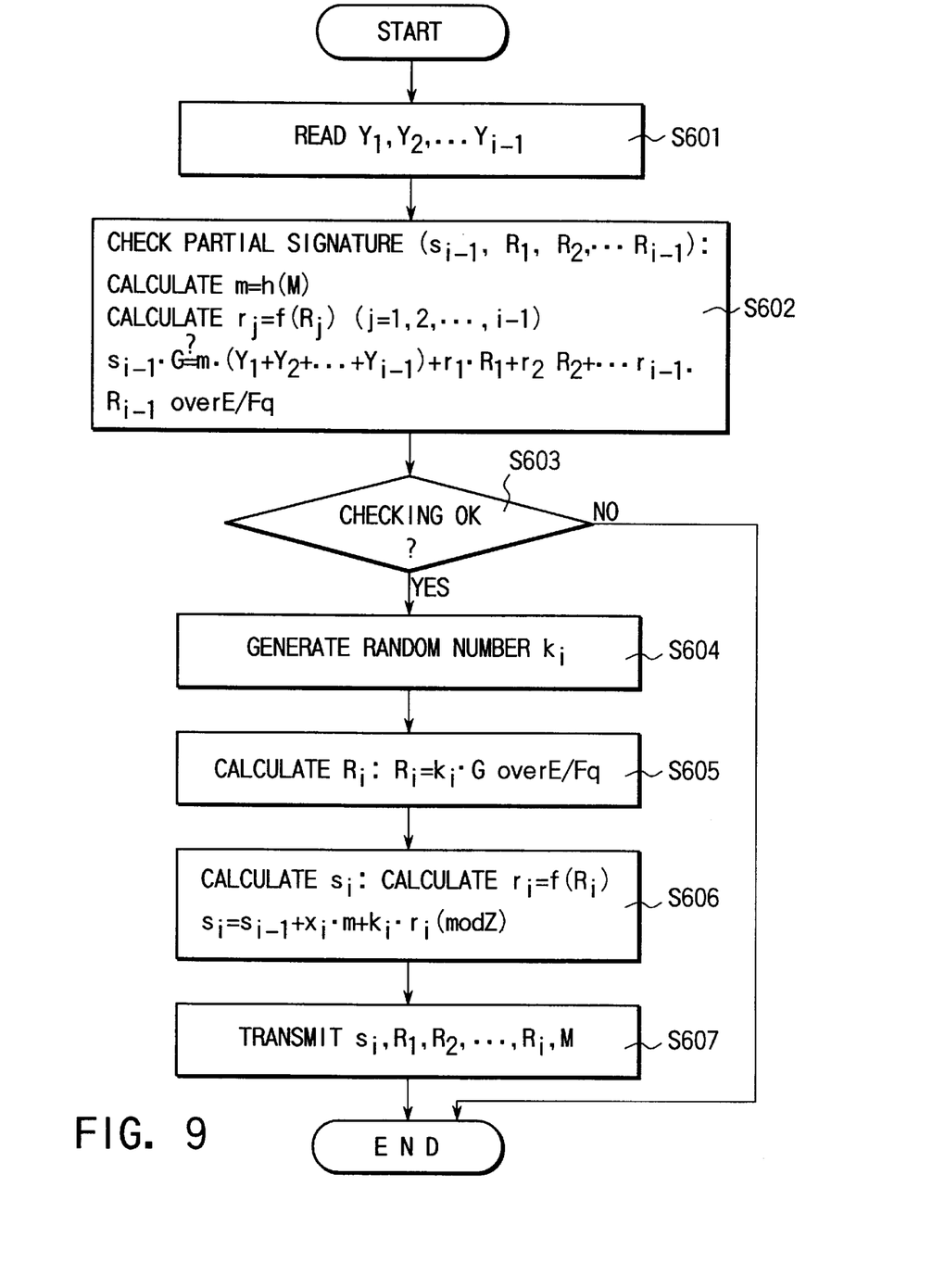
FIG. 9 shows the signature generating procedure in the single-round multisignature method.

Hereinafter, a digital signature method according to a third embodiment where the digital signature shown in FIGS. 2A and 2B has been applied to multisignature will be explained. FIG. 8 shows the flow of information in the third embodiment. Multisignature data is generated by just causing the information to take a round among a plurality of signature-generating entities. An n number of entities $U_1, U_2, \ldots, U_n$ are assumed to generate a multisignature. FIG. 9 shows the procedure at entity $U_i$.

<Procedure at Entity $U_i$>(i=1, 2, ..., n)

1: Take out the public keys $Y_1, Y_2, \ldots, Y_{i-1}$ of the entities $U_1, U_2, \ldots, U_{i-1}$ from the public key list (step 601)

2: Confirm that the $R_1, R_2, \ldots, R_{i-1}, s_{i-1}$, and M received from entity $U_{i-1}$ fulfill the following relationship: (step 602)

Calculate m=h(M)

Calculate $r_j$=f($R_j$) (j=1, 2, ..., i−1)

$$s_{i-1} \cdot G = m \cdot (Y_1 + \ldots + Y_{i-1}) + r_1 \cdot R_1 + r_2 \cdot R_2 + \ldots + r_{i-1} \cdot R_{i-1} \text{ over } E/Fq$$

3: If they do not fulfill the relationship at step 602, it is conceivable that abnormalities have occurred in the processing at entity $U_{i-1}$, and the processing will be terminated (step 603)

4: Generate random number $k_i$ (1<$k_i$<z−1) (step 604)

5: Generate $R_i$ in the following equation from the random number $k_i$ (step 605)

$$R_i = k_i \cdot G \text{ over } E/Fq$$

6: Calculate $s_i$ in the following equation using the information $s_{i-1}$ and the random number $k_i$ received from entity $U_{i-1}$ and the entity's secret key $x_i$ (step 606)

Calculate $r_i = f(R_i)$ $$s_i = s_{i-1} + x_i \cdot m + k_i \cdot r_i \bmod z$$

7: Send data items $s_i$, $R_1$, $R_2$, ..., $R_i$, plaintext data M to entity $U_{i+1}$ (step 607)

The above processes are executed at the entities, starting with entity $U_1$ to entity $U_n$ in sequence, thereby generating $s_n$, $R_1$, $R_2$, ..., $R_n$. The thus generated $s_n$, $R_1$, $R_2$, ... $R_n$ are a multiple signature that the entity $U_1$ to $U_n$ have put on the plaintext M. Entity $U_1$ carries out the processes at steps 605 and 606, provided that $R_0=0$ (the point at infinity) and $s_0=0$, and does not perform the process of checking the partial signature at step 601 to step 603.

The procedure for checking the multisignature generated by the procedure of FIG. 9 will be described by reference to FIG. 10.

1: Take out the public keys $Y_1$, $Y_2$, ..., $Y_n$ of the entities $U_1$, $U_2$, ..., $U_n$ from the public key list (step 701)

2: Confirm that $s_n$, $R_1$, $R_2$, ..., $R_n$, and M fulfill the following relationship: (step 702)

Calculate $m = h(M)$

Calculate $r_j = f(R_j)$ (j=1, 2, ..., i-1)

$$s_n \cdot G = m \cdot (Y_1 + \ldots + Y_n) + r_1 \cdot R_1 + r_2 \cdot R_2 + \ldots + r_n \cdot R_n \text{ over } E/Fq$$

When the relationship holds, $(s_n, R_1, R_2, \ldots, R_n)$ is judged to be the proper multisignature.

Figure 10:
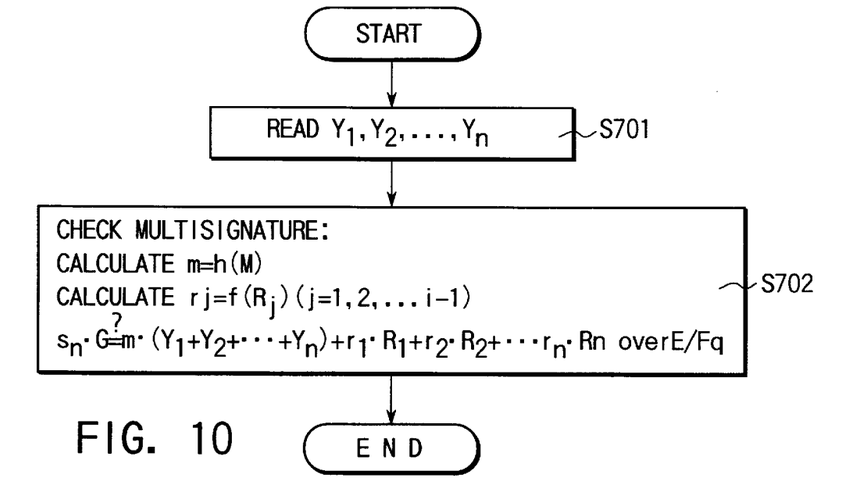
FIG. 10 shows the checking procedure in the single-round multisignature method.

The multisignature method shown in FIGS. 9 and 10 is less advantageous than the multisignature method shown in FIGS. 5A, 5B, and 6 in the data size and the amount of processing needed for checking but is more advantageous in that a signature can be generated by one round of processing.

As in the other embodiments, in the present multisignature procedure, too, $r = f(R_i, M)$ may be used in place of $r = r(R_i)$. Specifically, at step 602 in the procedure for generating a multisignature at entity $U_j$, $r_j = f(R_j, M)$ (j=1, 2, ..., i-1) is calculated and at step 606, $r_i = f(R_i, M)$ is calculated.

In the procedure for checking a multisignature, a modification is made so that $r_j = f(R_j, M)$ (j=1, 2, ..., i-1) may be calculated at step 702.

Figure 11:
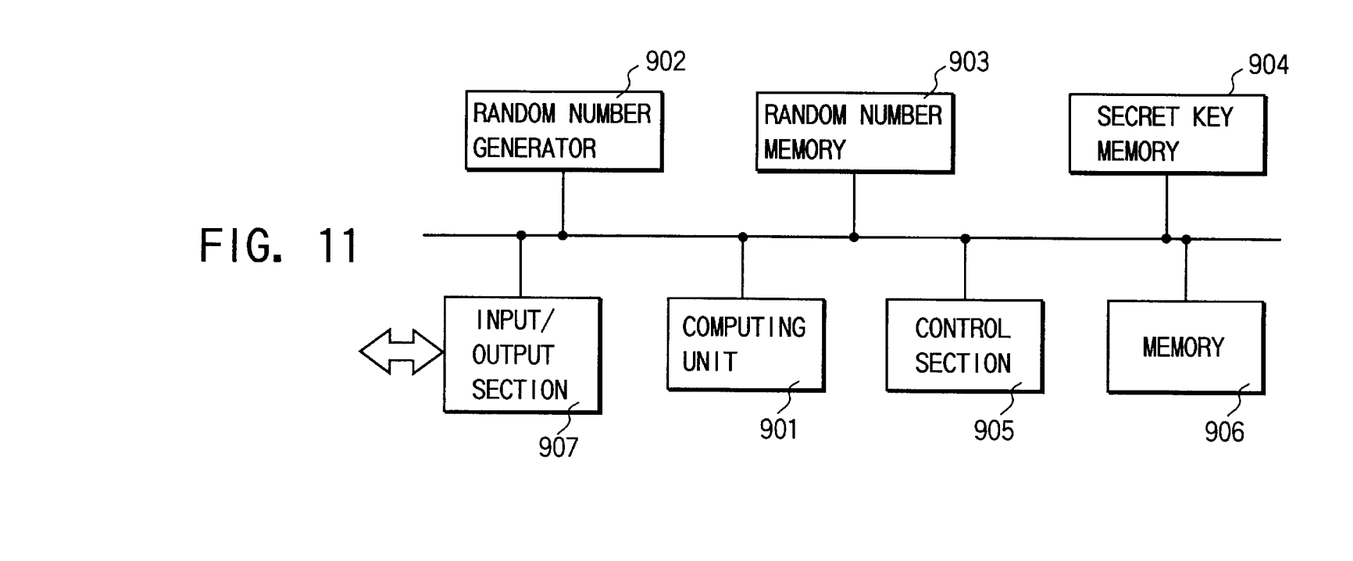
FIG. 11 shows an example of the configuration of a system that generates and checks digital signature data.

FIG. 11 shows an example of the configuration of a system that executes the generation and checking of the digital signature scheme according to the present embodiment.

A computing unit 901 does a multiple-precision arithmetic and carries out most of the arithmetic operation in the digital signature scheme. A random number generator 902 generates the necessary random number k in generating a signature. A random number memory 903 stores the random number k generated at the random number generator 902, the value $R = k \cdot G$ over E/Fq calculated from random number k, and a pair of the values obtained from $r = f(R)$. Besides in generating and checking a signature, the random number generator 902 and computing unit 901 operate to generate a pair of random numbers (k, R, r), which is stored in the random number memory 903. A secret key memory 904 stores entities' secret keys. The system further comprises a control section 905, a memory 906, and an input/output section 907.

Figure 12A:
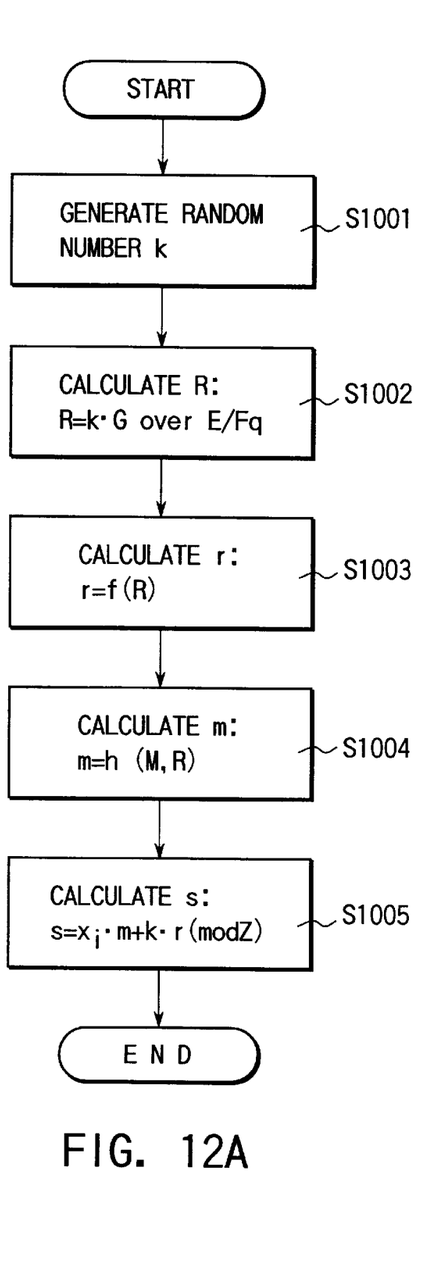
FIGS. 12A and 12B each show a modification of the signature procedure.

Finally, a modification of the signature scheme of the present embodiment will be described. The procedure by which the entity $U_i$ generates a digital signature for plaintext data M is as follows.

Procedure at Entity $U_i$

| | |
|---|---|
| 1: Generate a random number k ($1 < k < z - 1$) | (step 1001) |
| 2: Calculate $R = k \cdot G$ over E/Fq | (step 1002) |
| 3: Calculate $r = f(R)$ | (step 1003) |
| 4: Calculate $m = h(M,R)$ | (step 1004) |
| 5: Calculate $s = x_i \cdot m + k \cdot r \bmod z$ from m, r, and secret key $x_i$ | (step 1005) |

The R and s thus generated make a digital signature for the entity $U_i$'s plaintext data M.

Figure 12B:
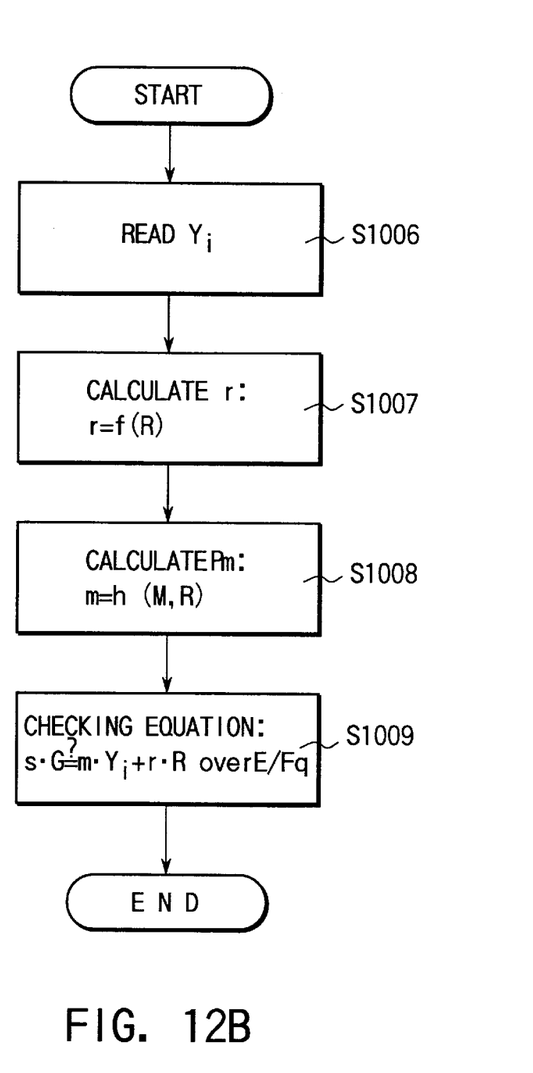

The procedure for checking the digital signature is as follows.

Signature Checking Procedure

| | |
|---|---|
| 1: Take out the entity $U_i$'s public key $Y_i$ from the public list | (step 1006) |
| 2: Calculate $r = f(R)$ | (step 1007) |
| 3: Calculate $m = h(M,R)$ | (step 1008) |
| 4: Confirm that r, s, m, $Y_i$ fulfill the following equation: $s \cdot G = m \cdot Y_i + r \cdot R$ over E/Fq | (step 1009) |

When they meet the equation, (R, s) is determined to be the digital signature that the entity $U_i$ has put on plaintext M.

With the scheme, in calculating m, hashing is done using not only plaintext M but also data on point R generated at random. In general, this approach is considered to improve safety. At step 1008, $m = h(M, R)$ may be replaced with $m = h(M, r)$.

To realize the procedure for a double-round multisignature (FIGS. 5A, 5B, and 6) in the modified scheme, $m = h(M)$ has only to be replaced with $m = h(M,R)$. In the procedure for a single-round multisignature (FIGS. 9 and 10), the signers each generate a different m, such as $m_1 = h(M, R_1)$, $m_2 = h(M, R_2)$, ..., $m_n = h(M, R_n)$, so the checking equation is changed to $s_i \cdot G = m_1 \cdot Y_1 + \ldots + m_n \cdot Y_n + r_1 \cdot R_1 + \ldots + r_n \cdot R_n$.

Figure 3:
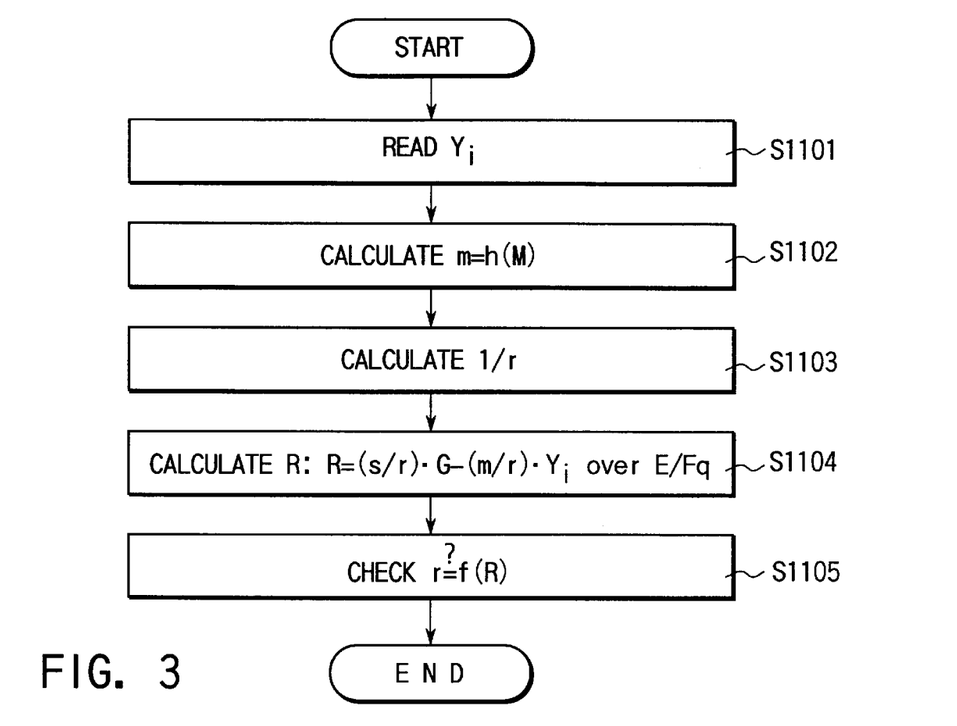
FIG. 3 shows a modification of the signature checking procedure in the digital signature method of the first embodiment.

Even when a multisignature method with the procedure as shown in FIGS. 12A and 12B is used, the checking procedure shown in FIGS. 3 and 7 can be applied.

As described above, with the present embodiment, it is possible to provide a digital signature method that enables a double-round or single-round multisignature to be generated easily by modifying an ElGamal signature on an elliptic curve.

As described until now, with the present invention, it is possible to provide a digital signature method that enables a multisignature system capable of dealing with various operation forms to be constructed easily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A digital signature method for generating digital signature data for plaintext data M and checking a signature on the basis of the digital signature data, said digital signature method comprising the steps of:

generating signature data satisfying public key Y=x·G including at least part of data on a point R of an elliptic curve E/Fq over a finite field Fq dependent on an arbitrarily generated random number k, base point G on the elliptic curve E/Fq, and an integer s dependent on the plaintext data M, secret key x, and the random number k; and checking a signature by confirming that a relational equation defined as $$\pm s \cdot G = \pm m \cdot Y \pm r \cdot R \text{ over } E/Fq$$

is satisfied, wherein
s and R constitute the signature data, m is an integer dependent only on the plaintext data M, and r is an integer dependent on at least point R of the elliptic curve E/Fq.

2. A digital signature method for generating digital signature data for plaintext data M and checking a signature on the basis of the digital signature data, said digital signature method comprising the steps of:

generating signature data satisfying public key Y=x·G including at least part of data on a point R of an elliptic curve E/Fq over a finite field Fq dependent on an arbitrarily generated random number k, base point G on the elliptic curve E/Fq, and an integer s dependent on the plaintext data M, secret key x, and the random number k; and checking a signature by confirming that a relational equation defined by an arithmetic operation between a first term s·G, a second term m·Y, and a third term r·R is satisfied, wherein
s and R constitute the signature data, m is an integer dependent only on the plaintext data M, and r is an integer dependent on at least point R of the elliptic curve E/Fq.

3. A digital signature method for generating digital signature data for plaintext data M among n number of signers and checking a signature on the basis of the digital signature data, said digital signature method comprising the steps of:

generating signature data satisfying public key $Y_i=x_i \cdot G$ for (i=1,2,3, . . . n) including at least part of data on a point R of an elliptic curve E/Fq over a finite field Fq dependent on random number $k_i$ generated for each of the signers, base point G on the elliptic curve E/Fq, and an integer s dependent on the plaintext data M, secret key $x_i$, and the random number $k_i$; and checking a signature by confirming that a relational equation defined as $$\pm s \cdot G = \pm m \cdot (Y_1+Y_2+ \ldots +Y_n) \pm r \cdot R \text{ over } E/Fq$$

is satisfied, wherein
s and R constitute the signature data, m is an integer dependent only on the plaintext data M, and r is an integer dependent on at least point R of the elliptic curve E/Fq.

4. A digital signature method for generating digital signature data for plaintext data M among n number of signers and checking a signature on the basis of the digital signature data, said digital signature method comprising the steps of:

generating signature data satisfying public key $Y_i=x_i \cdot G$ for (i=1, 2, 3, . . . , n) including at least part of data on a point R of an elliptic curve E/Fq over a finite field Fq dependent on random number $k_i$ generated for each of the signers, base point G on the elliptic curve E/Fq, and an integer s dependent on the plaintext data M, secret key $x_i$ for each of the signers, and each random number $k_i$; and checking a signature by confirming that a relational equation defined by an arithmetic operation between a first term s·G, a second term $m \cdot (Y_1+Y_2+ \ldots +Y_n)$, and a third term r·R is satisfied, wherein
s and R constitute the signature data, m is an integer dependent only on the plaintext data M, and r is an integer dependent on at least point R of the elliptic curve E/Fq.

5. A digital signature method for generating digital signature data for plaintext data M among n number of signers and checking a signature on the basis of the digital signature data, said digital signature method comprising the steps of:

generating signature data satisfying public key $Y_i=x_i \cdot G$ for (i=1, 2, 3, . . . , n) including at least part of data on a point $R_i$ of an elliptic curve E/Fq over a finite field Fq dependent on random number $k_i$ generated for each of the signers, base point G on the elliptic curve E/Fq, and an integer s dependent on the plaintext data M, secret key $x_i$ for each of the signers, and each random number $k_i$; and checking a signature by confirming that a relational equation defined by an arithmetic operation between a first term s·G, a second term $m \cdot (Y_1+Y_2+ \ldots +Y_n)$, and a third term $(r_1 \cdot R_1+r_2 \cdot R_2+ \ldots +r_n \cdot R_n)$ is satisfied, wherein s and R constitute the signature data, m is an integer dependent only on the plaintext data M, and r is an integer dependent on at least point R of the elliptic curve E/Fq.

6. A digital signature system for generating digital signature data for plaintext data M and for checking a signature based on the digital signature data, comprising:

a signature data generating device comprising means for generating signature data satisfying public key Y=x·G including at least part of data on a point R of an elliptic curve E/Fq over a finite field Fq dependent on an arbitrarily generated random number k, base point G on the elliptic curve E/Fq, and an integer s dependent on the plaintext data M, secret key x, and the random number k; and a signature checking device comprising means for checking a signature by confirming that a relational equation defined by a specific arithmetic operation between a first term s·G, a second term m·Y, and a third term r·R is satisfied, wherein
s and R constitute the signature data, m is an integer dependent only on the plaintext data M, and r is an integer dependent on at least point R of the elliptic curve E/Fq.

7. A digital signature system for generating digital signature data for plaintext data M among n number of signers and for checking a signature on the basis of the digital signature data, comprising:

a signature data generating device comprising means for generating signature data satisfying public key $Y_i=x_i \cdot G$ for (i=1, 2, 3, . . . n) including at least part of data on a point R of an elliptic curve E/Fq over a finite field Fq dependent on a random number $k_i$ generated for each of the signers, base point G on the elliptic curve E/Fq, and an integer s dependent on the plaintext data M, secret key $x_i$ for each of the signers, and each random number $k_i$; and a signature checking device comprising means for checking a signature by confirming that a relational equation defined by an arithmetic operation between a first term $s \cdot G$, a second term $m \cdot (Y_1+Y_2+ \ldots +Y_n)$, and a third term $r \cdot R$ is satisfied, wherein s and R constitute the signature data, m is an integer dependent only on the plaintext data M, and r is an integer dependent on at least point R of the elliptic curve E/Fq.

8. A digital signature system for generating digital signature data for plaintext data M among n number of signers and for checking a signature on the basis of the digital signature data, comprising:

a signature data generating device comprising means for generating signature data satisfying public key $Y_i=x_i \cdot G$ for (i=1, 2, 3, ... n) including at least part of data on a point $R_i$ of an elliptic curve E/Fq over a finite field Fq dependent on random number $k_i$ generated for each of the signers, base point G on the elliptic curve E/Fq, and an integer s dependent on the plaintext data M, secret key $x_i$ for each of the signers, and each random number $k_i$; and a signature checking device comprising means for checking a signature by confirming that a relational equation defined by an arithmetic operation between a first term $s \cdot G$, a second term $m \cdot (Y_1+Y_2+ \ldots +Y_n)$, and a third term $(r_1 \cdot R_1+r_2 \cdot R_2+ \ldots +r_n \cdot R_n)$ is satisfied, wherein s and R constitute the signature data, m is an integer dependent only on the plaintext data M, and r is an integer dependent on at least point R of the elliptic curve E/Fq.

9. A computer program storage device including a computer readable medium tangibly embodying a set of instructions from controlling a computing unit to perform a method for generating digital signature data for plaintext data M and checking a signature on the basis of the digital signature data, comprising the steps of:

generating signature data satisfying public key $Y=x \cdot G$ including at least part of data on a point R of an elliptic curve E/Fq over a finite field Fq dependent on an arbitrarily generated random number k, base point G on the elliptic curve E/Fq, and an integer s dependent on the plaintext data M, secret key x, and the random number k; and checking a signature by confirming that a relational equation defined by an arithmetic operation between a first term $s \cdot G$, a second term $m \cdot Y$, and a third term $r \cdot R$ is satisfied, wherein s and R constitute the signature data, m is an integer dependent only on the plaintext data M, and r is an integer dependent on at least point R of the elliptic curve E/Fq.

10. A computer program storage device including a computer readable medium tangibly embodying a set of instructions from controlling a computing unit to perform a method for generating digital signature data for plaintext data M and checking a signature on the basis of the digital signature data, comprising the steps of:

generating signature data satisfying public key $Y_i=x_i \cdot G$ for (i=1, 2, 3, ... , n) including at least part of data on a point R of an elliptic curve E/Fq over a finite field Fq dependent on random number $k_i$ generated for each of the signers, base point G on the elliptic curve E/Fq, and an integer s dependent on the plaintext data M, secret key $x_i$ for each of the signers, and each random number $k_i$; and checking a signature by confirming that a relational equation defined by an arithmetic operation between a first term $s \cdot G$, a second term $m \cdot (Y_1+Y_2+ \ldots +Y_n)$, and a third term $r \cdot R$ is satisfied, wherein s and R constitute the signature data, m is an integer dependent only on the plaintext data M, and r is an integer dependent on at least point R of the elliptic curve E/Fq.

11. A computer program storage device including a computer readable medium tangibly embodying a set of instructions from controlling a computing unit to perform a method for generating digital signature data for plaintext data M and checking a signature on the basis of the digital signature data, comprising the steps of:

generating signature data satisfying public key $Y_i=x_i \cdot G$ for (i=1, 2, 3, ... , n) including at least part of data on a point $R_i$ of an elliptic curve E/Fq over a finite field Fq dependent on random number $k_i$ generated for each of the signers, base point G on the elliptic curve E/Fq, and an integer s dependent on the plaintext data M, secret key $x_i$ for each of the signers, and each random number $k_i$; and checking a signature by confirming that a relational equation defined by an arithmetic operation between a first term $s \cdot G$, a second term $m \cdot (Y_1+Y_2+ \ldots +Y_n)$, and a third term $(r_1 \cdot R_1+r_2 \cdot R_2+ \ldots +r_n \cdot R_n)$ is satisfied, wherein s and R constitute the signature data, m is an integer dependent only on the plaintext data M, and r is an integer dependent on at least point R of the elliptic curve E/Fq.

12. A digital signature system for generating digital signature data for plaintext data M and for checking a signature based on the digital signature data, comprising:

a computing unit configured to generate signature data satisfying public key $Y=x \cdot G$ including at least part of data on a point R of an elliptic curve E/Fq over a finite field Fq dependent on an arbitrarily generated random number k, base point G on the elliptic curve E/Fq, and an integer s dependent on the plaintext data M, secret key x, and the random number k, and to check a signature by confirming that a relational equation defined by a specific arithmetic operation between a first term $s \cdot G$, a second term $m \cdot Y$, and a third term $r \cdot R$ is satisfied, wherein s and R constitute the signature data, m is an integer dependent only on the plaintext data M, and r is an integer dependent on at least point R of the elliptic curve E/Fq.

13. A digital signature system for generating digital signature data for plaintext data M among n number of signers and for checking a signature on the basis of the digital signature data, comprising:

a computing unit configured to generate signature data satisfying public key $Y_i=x_i \cdot G$ for (i=1, 2, 3, ... n) including at least part of data on a point R of an elliptic curve E/Fq over a finite field Fq dependent on an random number $k_i$ generated for each of the signers, base point G on the elliptic curve E/Fq, and an integer s dependent on the plaintext data M, secret key $x_i$ for each of the signers, and each random number $k_i$, and to check a signature by confirming that a relational equation defined by an arithmetic operation between a first term $s \cdot G$, a second term $m \cdot (Y_1+Y_2+ \ldots +Y_n)$, and a third term $r \cdot R$ is satisfied, wherein s and R constitute the signature data, m is an integer dependent only on the plaintext data M, and r is an integer dependent on at least point R of the elliptic curve E/Fq.

14. A digital signature system for generating digital signature data for plaintext data M among n number of signers and for checking a signature on the basis of the digital signature data, comprising:

a computing unit configured to generate signature data satisfying public key $Y_1 = x_i \cdot G$ for (i=1, 2, 3, ... n) including at least part of data on a point $R_i$ of an elliptic curve E/Fq over a finite field Fq dependent on random number $k_i$ generated for each of the signers, base point G on the elliptic curve E/Fq, and an integer s dependent on the plaintext data M, secret key $x_i$ for each of the signers, and each random number $k_i$, and to check a signature by confirming that a relational equation defined by an arithmetic operation between a first term $s \cdot G$, a second term $m \cdot (Y_1 + Y_2 + \ldots + Y_n)$, and a third term $(r_1 \cdot R_1 + r_2 \cdot R_2 + \ldots + r_n \cdot R_n)$ is satisfied, wherein s and R constitute the signature data, m is an integer dependent only on the plaintext data M, and r is an integer dependent on at least point R of the elliptic curve E/Fq.

\* \* \* \* \*